Sept. 9, 1941.         C. K. STILLWAGON                 2,255,131
                      BRAKE BEAM ASSEMBLY
                      Filed Sept. 3, 1940
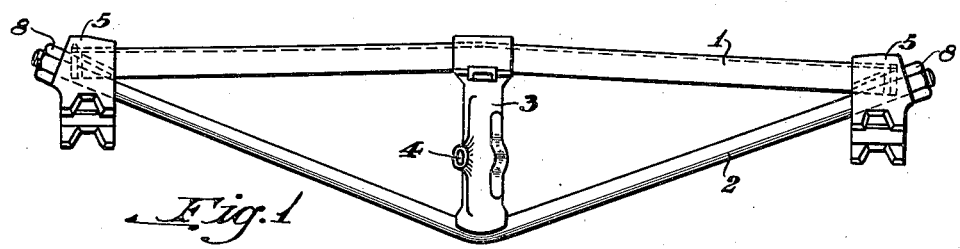
Fig. 1
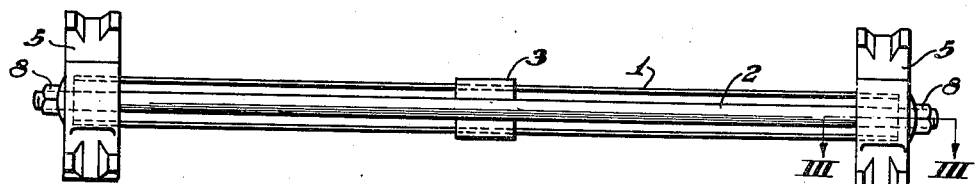
Fig. 2
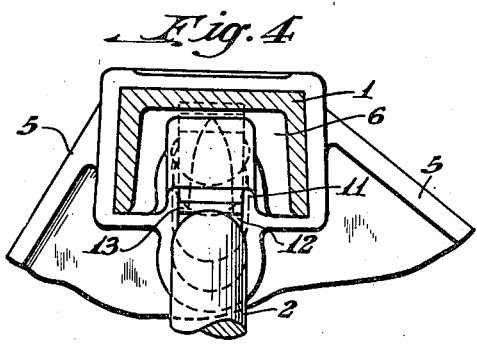
Fig. 4
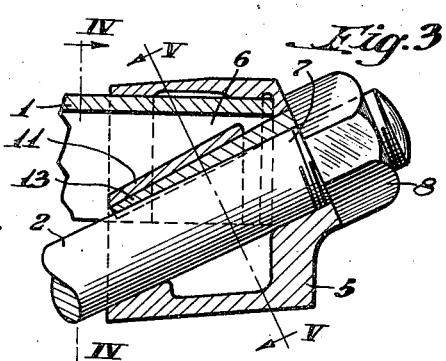
Fig. 3
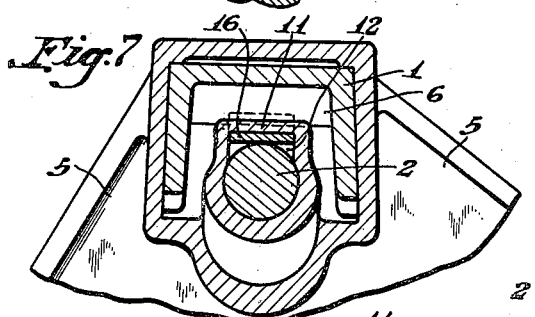
Fig. 7
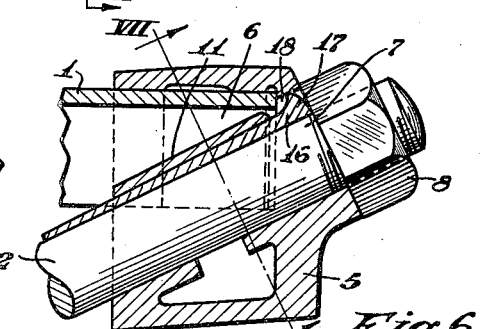
Fig. 6
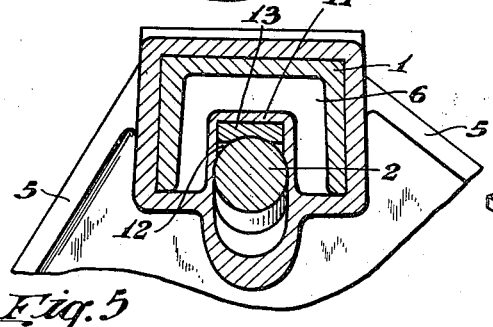
Fig. 5
Fig. 8
INVENTOR.
Charles K. Stillwagon
BY Brown, Critchlow & Flick
his ATTORNEYS.

Patented Sept. 9, 1941

2,255,131

UNITED STATES PATENT OFFICE 2,255,131

BRAKE BEAM ASSEMBLY

Charles K. Stillwagon, Johnstown, Pa., assignor to Davis Brake Beam Company, Johnstown, Pa., a corporation of Pennsylvania Application September 3, 1940, Serial No. 355,123

4 Claims. (Cl. 188—226)

This invention relates to railway brake beams, and in particular to those of a truss type.

Usually such a beam includes brake heads mounted on the opposite ends of a compression member, a tension rod spaced from the center of the compression member by a strut and having its ends passing through the brake heads, and nuts threaded on the ends of the tension rod and bearing against the outer faces of the brake heads to hold the heads in place. In conventional brake beam assemblies there is often clearance between the tension rod and the cast brake heads due to the difficulty of holding the adjoining parts to exact dimensions during manufacture. Further, it is desirable for economic reasons to use reclaimed tension rods and brake heads, and the previous wear of those parts generally causes them to fit loosely together. The principal objection to such clearance is that it permits relative movement or vibration between the adjoining parts, which results in rapid wear and a non-rigid beam.

It is among the objects of this invention to provide a brake beam assembly of rigid construction which is free of objectionable clearance between tension rod and brake heads, and which permits the satisfactory use of reclaimed rods and heads.

I accomplish these objects by wedging the tension rod tightly in the brake heads so as to take up all clearance initially between them. Each brake head is mounted on an end of the compression member in the conventional way and has a passage extending through it from one side to the other. This passage, through which the tension rod extends, flares toward one side of the brake head. A wedge which is driven into the passage tightly wedges the tension rod therein. A nut, threaded on the projecting end of the tension rod, bears against the outer face of the brake head and clamps the assembly rigidly together.

The invention is illustrated in the accompanying drawing, in which Fig. 1 is a plan view of a truss type brake beam; Fig. 2 is a side view thereof; Fig. 3 is an enlarged horizontal section taken through one end of the beam on line III—III of Fig. 2; Figs. 4 and 5 are vertical sections taken on lines IV—IV and V—V, respectively, of Fig. 3; Fig. 6 is a view similar to Fig. 3 illustrating a modification of the invention; Fig. 7 is a vertical section taken on line VII—VII of Fig. 6; and Fig. 8 is a perspective view of the wedge shown in Figs. 3, 4 and 5.

Referring to Figs. 1 and 2 of the drawing, the brake beam consists of a channeled compression member 1, and a tension member or rod 2 which is spaced from the center of the compression member by a strut 3 provided with a slot 4 for receiving a brake lever (not shown). Mounted on each end of the compression member is a brake head 5 which is provided with a recess 6 for receiving the compression member as well as the tension rod that projects through an opening 7 in the outer wall of the head. The brake head is clamped in place by a nut 8 threaded on the projecting end of rod 2 and bearing against the head.

In accordance with this invention the brake head is wedged tightly on the tension rod in order to eliminate clearance and consequent vibration between them. Accordingly, as shown in Figs. 3, 4 and 5, the brake head is provided interiorly of its recess 6 with a partition wall 11 that divides the recess into a compression member receiving portion and a passage 12 through which the tension rod extends. This passage is inclined, like rod 2, relative to the longitudinal axis of the compression member, and its outer end normally is closed by nut 8. The major portion of the wall of the passage conforms to the contour of the rod, but the central portion of partition wall 11 is substantially flat throughout its length and is deliberately spaced from the rod to form a socket between them. This flat wall is inclined away from the axis of the tension rod toward one of its ends so that the socket flares toward one end, or is tapered, as shown in Fig. 3. A wedge 13, driven into this socket, forces the tension rod against the opposite wall of passage 12 and thereby eliminates all play between the rod and head. The wedge may be rectangular, but its inner surface is preferably gouged out, as shown in Figs. 5 and 8, so that a substantial area of it will engage the tension rod.

It is preferred that the wedge-receiving socket taper away from nut 8, so that the wedge can be driven into it from the outer face of the brake head before the nut is screwed on the rod. A wedge is used of such thickness that it can be driven into the socket far enough to prevent its outer end from projecting from the outer face of the brake head. Nut 8 is therefore permitted to seat against the head in the conventional manner and to transmit thrust directly to the outer face of the head. The wedge need not be driven inwardly as far as desired, because tightening of the nut will force it in until its outer end is flush with the outer face of the brake head.

In addition to providing a rigid connection between brake head and beam, this invention results in a maximum area of contact between brake head and tension rod, whereby the strain exerted on the rod when the brakes are applied is distributed along the rod instead of being concentrated at one or two points where breakage is likely to occur.

In the embodiment of the invention shown in Figs. 6 and 7 a tapered wedge 16 is used which has a flat rod-engaging surface so that there is only a line contact between the wedge and tension rod. This wedge may be provided with a head 17 to facilitate driving it into position. In such a case the rod-receiving opening in the outer wall of the brake head is provided with an enlarged rectangular offset 18 for receiving the head so that nut 8 can seat against the brake head as in the first embodiment. Also, like in the first embodiment, head 17 tightly engages a wall of the rod-receiving opening in the outer wall of the brake head.

According to the provisions of the patent statutes I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. The combination with a truss type brake beam having a compression member and a tension member, of a brake head mounted on an end of the compression member and provided with a passage through which the tension member extends, a wedge driven into said passage from its outer end and extending substantially entirely through it to tightly wedge said tension member therein, and a nut threaded on the outer end of the tension member and bearing against the outer side of said head and overlying the outer end of the wedge.

2. The combination with a truss type brake beam having a compression member and a tension member, of a brake head mounted on an end of the compression member and provided with a passage through which the tension member extends, said passage flaring toward its outer end, a wedge driven into said passage to tightly wedge said tension member therein, and a nut threaded on the outer end of the tension member and bearing against the outer end of the wedge and the outer side of the head.

3. The combination with a truss type brake beam having a compression member and a tension member, of a brake head provided with a recess for receiving an end of the compression member and having an opening in its outer wall through which said tension member extends, a partition wall in said recess forming with a wall of the recess a passage through which the tension member extends, a portion of said passage flaring toward one end to form a tapered socket beside the tension member, a wedge driven into said socket for tightly wedging the tension member against the wall of the remainder of the passage, the outer end of the wedge extending into said opening and tightly engaging the wall of that opening, and a nut threaded on the outer end of the tension member.

4. The combination with a truss type brake beam having a compression member and a tension member, of a brake head provided with a recess for receiving an end of the compression member and having an opening in its outer wall through which said tension member extends, a partition wall in said recess forming with a wall of the recess a passage through which the tension member extends, a portion of said passage flaring toward one end to form a tapered socket beside the tension member, a wedge driven into said socket for tightly wedging the tension member against the wall of the remainder of the passage, the outer end of the wedge extending into said opening and provided with a head tightly engaging the wall of that opening, and a nut threaded on the outer end of the tension member.

CHAS. K. STILLWAGON.